United States Patent Office 3,586,696
Patented June 22, 1971

3,586,696
(ALKYL-, ARALKYL-, AND CYCLOALKYLTHIO) ARYLENEDICARBOXIMIDES
Joseph Edward Kerwood, Akron, Ohio, and Aubert Yaucher Coran, Creve Coeur, Mo., assignors to Monsanto Company, St. Louis, Mo.
No Drawing. Continuation-in-part of application Ser. No. 714,445, Mar. 20, 1968, which is a continuation-in-part of application Ser. No. 579,493, Sept. 15, 1966; and a continuation-in-part of application Ser. No. 549,730, May 12, 1966, which is a continuation-in-part of application Ser. No. 459,466, May 27, 1965. This application Feb. 25, 1969, Ser. No. 802,265
Int. Cl. C07d 27/52
U.S. Cl. 260—326
11 Claims

ABSTRACT OF THE DISCLOSURE

Sulfenamides characterized by carbonyl adjacent to the sulfenamide nitrogen, the characteristic nucleus of which is

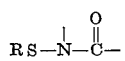

where the dangling valence on the nitrogen is linked to a second carbonyl, and both carbonyls are linked to arylene, and R is alkyl, aryl substituted alkyl, or cycloalkyl. The compounds inhibit premature vulcanization of vulcanizable elastomers, stabilize styrene-butadiene rubber, and inhibit growth of microorganisms.

CROSS REFERENCES TO RELATED APPLICATIONS

This application is a continuation-in-part of the application Ser. No. 714,445 filed Mar. 20, 1968 which is a continuation-in-part of the application Ser. No. 579,493 filed Sept. 15, 1966, now abondoned; and a continuation-in-part of the application Ser. No. 549,730 filed May 12, 1966, now abandoned, which is a continuation-in-part of the application Ser. No. 459,466 filed May 27, 1965, now abandoned.

BACKGROUND OF THE INVENTION

This invention relates to an improved vulcanizing process for rubber and to the rubber stocks obtained by using this improved process. The invention relates to improved accelerator-inhibitor combinations for rubber. The invention also relates to new compounds useful as inhibitors of premature vulcanization in rubber. More particularly, the invention relates to a method for preventing the premature vulcanization of rubber stocks and to the rubber stocks obtained by using this method.

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz., premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

There are several reasons offered for premature vulcanization. The discovery of the thiazolesulfenamide accelerators constituted a major breakthrough in the vulcanization art because thiazolesulfenamide delayed onset of the vulcanizing process, but once it started the built-in amine activation of the thiazole resulted in strong, rapid curing. Mercaptobenzothiazole is a valuable organic vulcanization accelerator but by present standards would be considered scorchy. It has been largely replaced by the delayed-action accelerators, but further improvement has eluded the art. The development of high pH furnace blacks which lack the inherent inhibiting effect of the acidic channel blacks and the popularity of certain phenylenediamine antigradants which promote scorching have placed increasingly stringent demands on the accelerator system.

Retarders have long been available to rubber compounders. These include N-nitrosodiphenylamine, salicyclic acid, and a terpene-resin acid blend. See editors of Rubber World,, "Compounding Ingredients for Rubber," 91–94 (3rd ed., 1961). Acids as retarders are generally ineffective with thiazolesulfenamide accelerators or adversely affect this vulcanizing process. Nitrosoamines as retarders are only of limited effectiveness with thiazolesulfenamides derived from primary amines. Certain sulfenamides which are not accelerators per se have been shown to retard mercaptobenzothiazole and other scorchy accelerators, but the effect on another sulfenamide incorporated as the primary accelerator has been marginal. Similarly, mixtures of accelerating sulfenamides have been proposed as a means of improving processing safety, but neither of these innovations has significantly improved a good delayed-action accelerator.

Some of the inhibitors of the invention have vulcanizing and accelerating properties in their own right. For example, Belgian Pat. 619,219 (1962) to U.S. Rubber discloses N-(trichloromethyl)thio maleimide as a vulcanizing agent. The sulfur-vulcanizing agents, accelerators, and antidegradants used in the combinations of this invention do not include the inhibitors of the invention. A combination of an accelerator and an inhibitor of this invention is an improved rubber additive which allows longer and safer processing time for rubber.

SUMMARY OF THE INVENTION

We have discovered a class of sulfenamides which are extremely valuable inhibitors of premature vulcanization. These are characterized by the presence of a carbonyl group adjacent to the sulfenamide nitrogen. The characteristic nucleus is

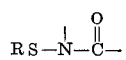

where the dangling valence on the nitrogen may be linked to a second carbonyl, alkyl, aryl, cycloalkyl, hydrogen, alkylene carbon, or arylene carbon and R is alkyl, aryl, or cycloalkyl. Aryl is used in the usual generic sense to mean any univalent organic radical where free valence belongs to an aromatic carbocyclic nucleus and not to a side chain. The term includes radicals substituted in the carbocyclic nucleus, for example, by alkyl, alkoxy, nitro, chloro, bromo, fluoro, iodo, and hydroxy. It is preferred that the carbocyclic nucleus contain not more than one electronegative substituent. Alkyl is used in the usual generic sense to mean univalent aliphatic radicals of the series $C_nH_{2n+1}$. Primary, secondary, and tertiary alkyls are included, for example, straight or branched chains.

However, primary and secondary alkyl hydrocarbons of 1 to 20 carbon atoms are the preferred alkyl compounds of this invention. The term cycloalkyl includes cycloalkyl radicals of 5 to 12 carbon atoms in the ring. Carbon atoms of the heterocyclic nuclei which contain hydrogen can be substituted by alkyl, alkoxy, nitro, chloro, bromo, fluoro, iodo, and hydroxy, for example, 1,3-bis(phenylthio)-5-chloro-2-benzimidazolinone.

An object of this invention is to promote the progress of science and useful arts. An object of this invention is to provide a method to effectively prevent the premature vulcanization of rubber. A further object of this invention is to provide new chemical compounds useful as premature vulcanization inhibitors especially with delayed-action thiazolesulfenamides. A further object of this invention is to provide a method for a faster rate of cure for vulcanizable rubber without premature vulcanization. A further object of this invention is to provide a method to increase the available processing time prior to the actual vulcanization of rubber. A further object of this invention is to provide a method to prevent the premature vulcanization of crude rubber in storage containing a vulcanizing and accelerating agent. A further object of this invention is to provide a method to prevent the premature vulcanization of rubber during the actual vulcanization step. A further object of this invention is to prevent the premature vulcanization of rubber at any time. A further object of this invention is to provide a safer method for processing and vulcanizing rubber. A further object of this invention is to provide a stabilizer for rubber. A further object of this invention is to provide new and improved vulcanized rubber products. A further object of this invention is to provide a vulcanized rubber stock in which the rate of reversion is reduced. Other objects of the invention will become apparent as the description of our invention proceeds. These objects are accomplished by using a sulfenamide derived from an amide or imide in the processing of rubber.

DESCRIPTION OF THE PREFERRED EMBODIMENTS

Our invention is that compounds having the formula

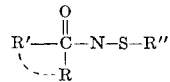

are excellent premature vulcanization inhibitors for a vulcanizable diene rubber where R and R' with the carbonyl and nitrogen atom constitute a radical, for example, N-phthalimidyl, N-naphthalimidyl, or N-(3,4,5,6-tetrahalophthalimidyl), and R" is alkyl, aryl, or cycloalkyl. More specific examples of R" are methyl, ethyl, propyl, isopropyl, butyl, amyl, t-butyl, benzyl, cyclooctyl, cyclopentyl, and cyclododecyl.

Examples of the new compounds of the invention are

N-(cyclohexylthio)phthalimide,
N-(cyclopentylthio)phthalimide,
N-(cyclododecylthio)phthalimide,
N-(cyclooctylthio)phthalimide,
N-(benzylthio)phthalimide,
N-(methylthio)phthalimide,
N-(ethylthio)phthalimide,
N-(propylthio)phthalimide,
N-(isopropylthio)phthalimide,
N-(n-butylthio)phthalimide,
N-(t-butylthio)phthalimide,
N-(isobutylthio)phthalimide,
N-(sec.-butylthio)phthalimide,
N-(n-pentylthio)phthalimide,
N-(n-heptylthio)phthalimide,
N-(n-hexylthio)phthalimide,
N-(n-octylthio)phthalimide,
N-(n-dodecylthio)phthalimide,
N-(n-eicosylthio)phthalimide,
N-benzylthio-3,4,5,6-tetrachlorophthalimide,
N-n-butylthio-3,4,5,6-tetrachlorophthalimide,
N-n-dodecylthio-3,4,5,6-tetrachlorophthalimide,
N-cyclohexylthio-3,4,5,6-tetrachlorophthalimide,
N-cyclooctylthio-3,4,5,6-tetrachlorophthalimide,
N-cyclohexylthio-3,4,5,6-tetrabromophthalimide,
N-(benzylthio)naphthalimide,
N-(n-butylthio)naphthalimide,
N-(n-dodecylthio)naphthalimide,
N-(cyclohexylthio)naphthalimide,
N-(cyclooctylthio)naphthalimide, and
N[(alpha-chlorocyclohexyl)thio]-phthalimide.

The inhibitors of our invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. The invention relates to diene rubbers, and the terms rubber and diene rubber are synonymous for the purpose of this invention.

The new compounds of this invention are prepared as follows:

To prepare N-(n-eicosylthio)phthalimide 84.0 g. (0.25 mole) 92% eicosylmercaptan is dissolved in 150 ml. of n-pentane, then 23.0 g. (0.33 mole) of anhydrous chlorine gas is passed through this solution over a 25 minute period of 15–20° C. The excess chlorine and hydrogen chloride gases are removed in vacuo. The resulting sulfenyl chloride solution is added dropwise over a 45 minute period to a solution of 36.0 g. (0.25 mole) of phthalimide and 30.0 g. (0.3 mole) of triethylamine in 250 ml. of dimethylformamide. The reaction temperature rises from about 23° C. to about 40° C. The resulting slurry of triethylamine hydrochloride is allowed to stir for 15 minutes after all of the sulfenyl chloride is added and then quenched by adding 2.0 liters of ice water. The N-(n-eicosylthio)phthalimide, a white solid, is collected by filtration and dried at room temperature. The yield is 90%. After recrystallizing a sample from heptane, the melting point is 85–86° C. Analysis of the product shows 3.24% nitrogen and 7.03% sulfur. Calculated percentages for $C_{28}H_{45}NO_2S$ are 3.05% nitrogen and 6.97% sulfur.

To prepare N-(cyclododecylthio)phthalimide 41.0 g. (0.17 mole) of cyclododecylmercaptan is dissolved in 150 ml. of n-pentane, then 7.0 g. of anhydrous chlorine gas is added at 28–30° in ten minutes. The reaction mixture is cooled to 0° C. and an additional 7.0 g. of anhydrous chlorine gas is added in 10 minutes making a total of 14 g. of chlorine (0.197 mole). The excess chlorine and hydrogen chloride gases are removed in vacuo. The resulting sulfenyl chloride is added dropwise over a 30 minute period to a solution of 25.0 g. (0.17 mole) of phthalimide and 23.0 g. (0.23 mole) of triethylamine in 200 ml. of dimethylformamide. The reaction temperature rises from about 23° C. to 33° C. The resulting slurry of triethylamine hydrochloride is allowed to stir for 15 minutes after all of the sulfenyl chloride is added and then quenched by adding 2.0 liters of ice water. The N-(cyclododecylthio)phthalimide, a white solid, is collected by filtration and dried at room temperature. After recrystallizing a sample from heptane, the melting point is 156–158° C. Analysis of the product shows 4.24% nitrogen and 9.13% sulfur. Calculated percentages for $C_{20}H_{27}NO_2S$ are 4.05% nitrogen and 9.28% sulfur.

To prepare N-(cyclohexylthio)phthalimide 23.2 grams (0.2 mole) of cyclohexylmercaptan is dissolved in 150 ml. of n-pentane, then 14.2 grams (0.2 mole) of anhydrous chlorine gas is passed through this solution at 0° to 5° C. over a 25-minute period. The resulting sulfenyl chloride solution is added dropwise over a thirty minute period to a solution of 29.4 grams (0.2 mole) of phthalimide and 27.0 grams (0.27 mole) of triethylamine in 120 ml. of dimethylformamide. The reaction temperature rises from about 25° C. to about 39° C. The reaction mixture is allowed to cool. Then it is diluted with two liters of ice cold water. A white crystalline product precipitates. The yield is quantitative. The melting point of the N-(cyclohexylthio)phthalimide is 89°–91° C. After recrystallization of a sample of the product, the melting point is 93°–94° C. Iodometric titration of the crystallized N-(cyclohexylthio)phthalimide shows 99% purity. Analysis of the product shows 5.48% nitrogen and 12.14% sulfur. Calculated percentages for $C_{14}H_{15}NO_2S$ are 5.36% nitrogen and 12.26% sulfur. The new cycloalkyl, phenyl substituted alkyl and alkyl compounds listed supra are prepared in a similar manner with comparable results.

The physical properties of representative examples are recorded below:

| Thiophthalimide | Appearance | M.P., °C. |
| --- | --- | --- |
| t-Butyl | White solid | 127.5–129.5 |
| t-Dodecyl | Liquid | |
| Benzyl | White solid | 167–167.5 |
| n-Dodecyl | do | 65 |
| t-Octyl | Liquid | |
| Isopropyl | White crystals | 63.5–64 |
| n-Butyl | do | 65–66 |
| Sec butyl | do | 43.5–45 |
| n-Propyl | do | 77–78 |
| n-Hexyl | do | 60 |
| t-Hexyl | do | 62–66 |
| n-Pentyl | do | 59–60 |
| n-Octyl | do | 52 |
| Isobutyl | do | 69–69.5 |
| Ethyl | do | 115–118 |
| Cyclooctyl | White solid | 97–99 |
| Cyclopentyl | do | 93–95 |
| 3,3-dimethylbutyl | do | 100–101 |
| Methyl | do | 181–183 |

Any of the cycloalkyl, alkyl, and (phenylsubstituted alkylthio)arylenedicarboximides are prepared in similar manner and possess similar properties. Replacing phthalimide by an equivalent molar proportion of 4-chlorophthalimide, 3-methylphthalimide, 4-methylphthalimide, 3-nitrophthalimide, or 4-nitrophthalimide in the above-described reaction with cyclohexyl sulfenylchloride yields solid crystalline products useful for inhibiting prevulcanization. For example, N-(cyclohexylthio)-4-nitrophthalimide is a light yellow solid, melting point 115°–120° C., valuable for increasing processing safety of vulcanizable rubber stocks. The new compounds may be conveniently represented by the formula

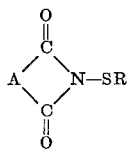

wherein A is orthoarylene and R is hydrocarbon, preferably of 1–20 carbon atoms which is alkyl, cycloalkyl, or aryl-substituted alkyl. A includes phenylene and naphthylene either of which may be substituted by one or more nitro, halogen or lower alkyl substituents.

The following tables illustrate the invention in greater detail and the best mode for carrying it out, but are not to be construed as to narrow the scope of our invention. For all the rubber stocks tested and described, infra, as illustrative of the invention, Mooney scorch times at 121° C. and 135° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney Scorch Time of the control stock; multiplying by 100, and subtracting 100. These increases show the percentage improvement in scorch delay over the control stock which contains no inhibitor. Additionally, cure ratings are calculated from the time required to cure the stocks at 144° C., and in some cases 153° C. Curing characteristics are determined by means of the Monsanto oscillating disc rheometer described by Decker, Wise, and Guerry in Rubber World, December 1962, page 68. From the rheometer data, R.M.T. is the maximum torque in rheometer units, $t_3$ or $t_2$ is the time in minutes for a rise of three or two rheometer units, respectively, above the minimum reading and $t_{90}$ is the time required to obtain a torque 90% of the maximum.

The trademarks of some compounds used in the practice of this invention are Santocure MOR, Santoflex 77, Santocure NS, DPG, Thiofide, and Vultrol. Santocure MOR is the accelerator 2-(morpholinothio)benzothiazole. Santoflex 77 is the antidegradant N,N'-bis(1,4-dimethylpentyl)-p-phenylenediamine. Santocure NS is the accelerator N-tert-butyl-2-benzothiazolesulfenamide. DPG is an accelerator reported to be diphenylguanidine. Thiofide is an accelerator reported to be benzothiazyl disulfide. Vultrol is a vulcanization retarder reported to be N-nitrosodiphenylamine.

Table I illustrates the excellent results obtained using N-(cyclohexylthio)phthalimide as a premature vulcanization inhibitor in stocks of natural rubber, oil-extended styrene-butadiene rubber and a natural rubber/cis-4-polybutadiene blend tread stock. The natural rubber tread stock is composed of the following:

Natural rubber tread stock

|  | Parts |
| --- | --- |
| Natural rubber smoked sheets | 100.0 |
| Intermediate super abrasion furance carbon black | 45.0 |
| Zinc oxide | 3.0 |
| Stearic acid | 2.0 |
| Aromatic oil | 5.0 |
| N-1,3-dimethylbutyl-N' - phenyl - p - phenylenediamine | 2.0 |
| Santocure MOR | 0.5 |
| Sulfur | 2.5 |

The oil-extended styrene-butadiene rubber tread stock is composed of the following:

Oil-extended styrene-butadiene rubber tread stock

|  | Parts |
| --- | --- |
| Oil-extended styrene-butadiene rubber 1712 | 137.0 |
| Aromatic oil | 1.5 |
| Intermediate super abrasion furnace carbon black | 65.0 |
| Zinc oxide | 3.0 |
| Stearic acid | 1.0 |
| N - 1,3 - dimethylbutyl - N'-phenyl-p-phenylenediamine | 2.0 |
| Santocure MOR | 1.2 |
| Sulfur | 2.0 |

The natural rubber/cis-4-polybutadiene blend tread is composed of the following:

Natural rubber/polybutadiene blend tread stock

|  | Parts |
| --- | --- |
| Natural rubber smoked sheets | 75.0 |
| Cis-4-polybutadiene | 25.0 |
| Aromatic oil | 5.0 |
| Zinc oxide | 3.0 |
| Stearic acid | 2.0 |
| Intermediate super abrasion furnace carbon black | 45.0 |
| N - 1,3 - dimethylbutyl - N' - phenyl - p - phenylenediamine | 2.0 |
| Santocure NS | 0.65 |
| Sulfur | 1.75 |

TABLE I

| | Parts | | |
|---|---|---|---|
| Natural rubber tread stock: | | | |
| N-(cyclohexylthio)phthalimide | 1.0 | | |
| Mooney Scorch at 121° C.: | | | |
| $t_5$ min | 21.2 | 98.3 | |
| Percent increase in scorch delay | | 363.0 | |
| Rheometer at 144° C.: | | | |
| $t_2$ | 7.3 | 22.0 | |
| $t_{90}$ | 20.3 | 40.6 | |
| R.M.T | 59.0 | 58.0 | |
| $k_2$ | .162 | .173 | |
| Oil-extended styrene-butadiene tread stock: | | | |
| N-(cyclohexylthio)phthalimide | 0.25 | 0.50 | 1.00 |
| Mooney Scorch at 135° C.: | | | |
| $t_5$ min | 20.9 | 42.6 | 53.7 | 70.4 |
| Percent increase in scorch delay | | 38 | 74 | 128 |
| Rheometer at 153° C.: | | | |
| $t_2$ | 13.8 | 17.8 | 20.0 | 25.0 |
| $t_{90}$ | 25.5 | 31.7 | 35.4 | 41.0 |
| R.M.T | 42.8 | 42.2 | 41.6 | 40.5 |
| $k_2$ | .165 | .168 | .173 | .177 |
| Natural rubber/polybutadiene blend tread stock: | | | |
| N-(cyclohexylthio)phthalimide | 0.1 | 0.2 | 0.4 |
| Mooney Scorch: | | | |
| $t_5$ min. at 121° C | 35.1 | 55.8 | 68.4 | 86.0 |
| Percent increase in scorch delay | | 59 | 95 | 145 |
| $t_5$ min. at 135° C | 15.0 | 23.6 | 28.1 | 36.3 |
| Percent increase in scorch delay | | 53 | 87 | 142 |

In the above described natural rubber tread stock N-(methylthio)phthalimide and N-(n-eicosylthio)phthalimide show about a 95% increase in scorch delay and N-(cyclododecylthio)phthalimide shows about a 275% increase.

Table II illustrates the results of using N-(benzylthio)phthalimide and N-(n-dodecylthio)phthalimide in oil-extended styrene-butadiene rubber. The rubber stock is the same as the oil-extended styrene-butadiene rubber stock described for Table I above.

TABLE II

| | Parts | | |
|---|---|---|---|
| N-(benzylthio)phthalimide | 0.25 | 0.50 | 1.00 |
| Mooney Scorch at 135° C.: | | | |
| $t_5$ min | 26.4 | 31.7 | 34.6 | 38.3 |
| Percent increase in scorch delay | | 20 | 35 | 45 |
| N-(n-dodecylthio)phthalimide | 0.25 | 0.50 | 1.00 |
| Mooney Scorch at 135° C.: | | | |
| $t_5$ min | 26.4 | 28.8 | 33.9 | 38.1 |
| Percent increase in scorch delay | | 9 | 28 | 44 |

Table III shows the results of tests on N-(t-butylthio)phthalimide, as premature vulcanization inhibitor. The rubber mixture of the test is an A-6 masterbatch. An A-6 masterbatch is composed of the following:

| | Parts |
|---|---|
| Smoked sheets | 100 |
| High abrasion furnace black | 50 |
| Zinc oxide | 5 |
| Stearic acid | 3 |
| Hydrocarbon softener | 10 |
| Total parts | 168 |

All stocks contain three parts Santoflex 77, 0.5 part Santocure MOR, and 2.5 parts sulfur.

TABLE III

| | | |
|---|---|---|
| A-6 masterbatch | 168 | 168 |
| N-(t-butylthio)phthalimide | | 1.0 |
| Mooney Scorch at 121° C.: | | |
| $t_5$ | 24.5 | 28.1 |
| Percent increase in scorch delay | | 17.0 |
| Rheometer at 144° C.: | | |
| R.M.T | 67.3 | 56.7 |
| $t_3$ | 9.0 | 10.8 |
| $t_{90}$ | 21.5 | 34.2 |

Comparable results are obtained when the accelerator Santocure NS and the antidegradant N-1,3-dimethylbutyl-N'-phenyl-p-phenylenediamine or a mixture of this antidegradant and Santoflex 77 are used.

Table IV illustrates the useful premature vulcanization properties in an A-6 rubber masterbatch of N-(isopropylthio)phthalimide and N-(n-butylthio)phthalimide. The stocks contain 2.0 parts N-1,3-dimethylbutyl-N'-phenyl-p-phenylenediamine, 0.5 part Santocure MOR, and 2.5 parts sulfur.

TABLE IV

| | | | |
|---|---|---|---|
| Control | | | |
| N-(isopropylthio)phthalimide | | 1.0 | |
| N-(n-butylthio)phthalimide | | | 1.0 |
| Mooney Scorch at 135° C.: | | | |
| $t_5$ | 12.9 | 37.4 | 37.8 |
| Percent increase in scorch delay | | 189.0 | 193.0 |
| Rheometer at 144° C.: | | | |
| $t_2$ | 9.8 | 24.0 | 26.0 |
| $t_{90}$ | 27.0 | 47.5 | 45.0 |
| R.M.T | 55.0 | 57.0 | 56.5 |
| $k_2$ | .138 | .130 | .128 |

In similar tests, N-(sec.-butylthio)phthalimide shows a 212% increase in scorch delay.

In an A-6 masterbatch containing 0.5 part Santocure MOR, 2.5 parts sulfur, and 3 parts Santoflex 77, the known compound, N-(phenylthio)phthalimide shows a 108% increase in scorch delay. N-(phenylthio)phthalimide is difficult to disperse in rubber probably due to its high melting point (163°–165° C.).

Comparable results to those in the tables, supra, illustrating utility are obtained with the inhibitors of this invention which are not illustrated.

Concentration studies show the inhibitors of this invention are effective in rubber at concentrations of 0.05 to 5.0 parts per hundred. Concentrations from 0.10 to 3.0 parts per hundred are preferred.

A wide variety of combinations of Santocure NS and N-(phenylthio)succinimide show storage stability in an eight-week oven aging test at 50° C. These combinations are improved vulcanization accelerators in rubber whereby premature vulcanization is effectively inhibited. Effective inhibitor concentrations for the combination range from 1 to 9 parts of inhibitor. Comparable results are obtained when other accelerator and inhibitor combinations of this invention are tested for stability.

Table V illustrates storage stability improvement for the accelerators Santocure NS and Santocure MOR, when samples of combinations of these accelerators with N-(cyclohexylthio)phthalimide (50:50 blends) are oven aged for 21 days at 50° C., over samples of Santocure NS and Santocure MOR alone. The aged samples are compared to samples which have not been aged.

TABLE V

| | Assay | | Decrease in assay |
|---|---|---|---|
| | 0 days | 21 days | |
| Santocure NS | 99.2 | 97.6 | 1.6 |
| Santocure MOR | 99.4 | 91.6 | 7.8 |
| Santocure NS | 49.3 | 50.0 | None |
| N-(cyclohexylthio)phthalimide | 49.6 | | |
| Santocure MOR | 46.9 | 47.0 | None |
| N-(cyclohexylthio)phthalimide | 50.1 | | |

The data in Table V illustrate that there is no decrease in assay for Santocure NS or Santocure MOR when these accelerators are used in the combinations of this invention. Decreases in assay in Santocure NS and Santocure MOR alone are illustrated in the table to be 1.6 for Santocure NS and 7.8 for Santocure MOR.

N-(cyclohexylthio)phthalimide is useful as a stabilizer for styrene-butadiene rubber which has gone through a coagulation step. The styrene-butadiene rubber used is known commercially as SBR-1502. The SBR is prepared for the stabilizer test by adjusting the temperature of 1000 grams of unstabilized SBR latex in a beaker to 45°–50° C. The latex contains about 20% rubber, 79% water, and 1% soap. The initial pH of the latex is about 10. To this is added 335 ml. of 12.5% NaCl solution. The stabilizer to be tested is added in an emulsified form and then 1000 ml. of dilute (0.2%) sulfuric acid is added at a fast-dropping rate during about 20 minutes. As the pH falls during the acid addition, coagulation starts at about pH 9.0–9.5 and continues throughout the acidification. The pH is finally adjusted with 2% sulfuric acid to between about 2 and 4. The mixture is filtered, and the SBR crumbs are washed with water, then dried in a vacuum oven. The dried SBR crumbs are then milled to uniformity, sheeted out at about 0.008″, and air and oven aged. The SBR containing N-(cyclohexylthio)phthalimide is compared to SBR containing the known stabilizer tris(nonylphenyl) phosphite, and to a blank which is SBR with no stabilizer present. The Mooney viscosity of the three stocks is determined initially and after oven aging at 100° C. for 16, 30, and 48 hours. The results are recorded in Table VI. The Mooney viscosity is the torque required to turn a rotor embedded in the rubber sample after rotating 4 minutes. The Mooney Viscosity Test has the American Society for Testing and Materials Designation D-1646-63.

TABLE VI

| Aging time, hours | 0 | 16 | 30 | 48 |
|---|---|---|---|---|
| Stock containing: | | | | |
| Blank | 51 | 104 | 103 | 124 |
| Tris(nonylphenyl)phosphite (1.25 p.p.h.[1]) | 47.5 | 56.5 | 70 | 89 |
| N-(cyclohexylthio)phthalimide (1.25 p.p.h.[1]) | 46.5 | 69 | 73 | 88 |

[1] Parts per hundred.

Comparable results to those in Table VI are obtained in the other diene rubbers of this invention.

The N-(alkylthio-), N-(aralkylthio-) and N-(cycloalkylthio) arylenedicarboximides of this invention are toxic to microorganisms and are useful for the preservation of industrial articles subject to attack by fungi and bacteria. They are useful for the preservation of cotton, leather, paint, rope and the like. When subjected to standard testing procedures compounds of the formula R—S—R′ where R′ is N-phthalimidyl and R is ethyl, isopropyl, propyl, sec. butyl, isobutyl, pentyl, hexyl, cyclohexyl or benzyl prevent growth of *Staphylococcus aureus*, *Salmonella typhosa*, *Pseudomonas aeruginosa* and *Aspergillus niger* at concentrations of 1/1000 or lower.

It is intended to cover all changes and modifications of the examples of the invention herein chosen for purposes of disclosure which do not constitute departures from the spirit and scope of the invention. The matter contained in each of the following claims is to be read as part of the general description of the present invention.

We claim:
1. A compound of the formula

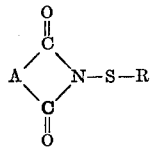

wherein A is ortho phenylene, naphthylene, nitrophenylene, lower alkyl phenylene or halogen substituted phenylene and R is hydrocarbon of 1-20 carbon atoms which is alkyl, cycloalkyl of 5 to 12 carbon atoms, or phenyl substituted alkyl.

2. A compound of claim 1 where A is phenylene.
3. A compound according to claim 2 wherein R is alkyl or cycloalkyl.
4. A compound according to claim 1 wherein A is phenylene and R is cycloalkyl of 5-12 carbon atoms.
5. A compound according to claim 1 wherein A is phenylene and R is alkyl.
6. A compound according to claim 1 wherein A is phenylene and R is phenyl substituted alkyl.
7. A compound according to claim 1 of the formula

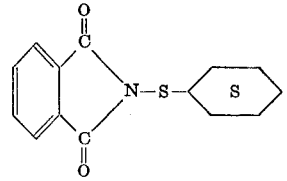

and named N-(cyclohexylthio)phthalimide.

8. A compound according to claim 1 of the formula

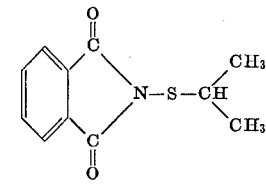

and named N-(isopropylthio)phthalimide.

9. A compound according to claim 1 of the formula

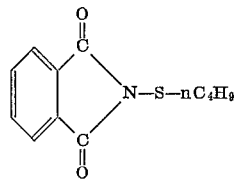

and named N-(n-butylthio)phthalimide.

10. A compound according to claim 1 of the formula

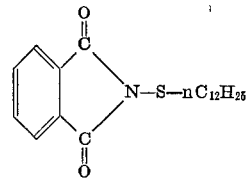

and named N-(n-dodecylthio)phthalimide.

11. A compound according to claim 1 of the formula

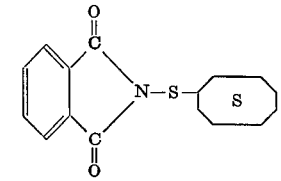

and named N-(cyclooctylthio)phthalimide.

References Cited

Kliveny et al., Chem. Abs., 51: 1882 (1957).

ALEX MAZEL, Primary Examiner

J. A. NARCAVAGE, Assistant Examiner

U.S. Cl. X.R.
252—402; 260—999